(12) United States Patent  (10) Patent No.: US 8,365,656 B2
Fouquet  (45) Date of Patent: Feb. 5, 2013

(54) FOOD PROCESSOR OF THE CITRUS PRESS OR JUICER TYPE

(75) Inventor: André Nicolas Fouquet, Chassieu (FR)

(73) Assignee: Santos, Vaulx en Velin (FR)

( * ) Notice: Subject to any disclaimer, the term of this patent is extended or adjusted under 35 U.S.C. 154(b) by 656 days.

(21) Appl. No.: 12/588,964

(22) Filed: Nov. 3, 2009

(65) Prior Publication Data
US 2010/0116152 A1 May 13, 2010

(30) Foreign Application Priority Data
Nov. 3, 2008 (FR) ...................................... 08 57457

(51) Int. Cl.
*A23J 1/00* (2006.01)
*A47J 43/08* (2006.01)
(52) U.S. Cl. ............................... 99/501; 99/503; 99/508
(58) Field of Classification Search ............ 99/501–503, 99/505–508; 210/377; 100/111, 132, 213
See application file for complete search history.

(56) References Cited

U.S. PATENT DOCUMENTS

| 2,282,623 | A | * | 5/1942 | Mize | 99/503 |
| 3,566,939 | A | * | 3/1971 | Hubrich | 99/501 |
| 4,080,885 | A | * | 3/1978 | Pauty | 99/501 |
| 4,157,062 | A | | 6/1979 | Ackeret | |
| 5,445,069 | A | | 8/1995 | Lucas | |

FOREIGN PATENT DOCUMENTS

| FR | 2 649 878 A | 1/1991 |
| GB | 2 249 037 A | 4/1992 |
| GB | 2 275 415 A | 8/1994 |

* cited by examiner

*Primary Examiner* — Kien Nguyen
(74) *Attorney, Agent, or Firm* — Dowell & Dowell, PC

(57) ABSTRACT

A rotary food processor including a base unit, drive elements provided with a rotary motor spindle, an active processing implement, a driveshaft to drive the active implement, and wherein the driveshaft is movable from a rest position to an active position in which it rotates by a force applied by a user. The driveshaft is a hollow shaft which defines an open housing in which the rotary spindle is at least partially retained and the rotary spindle freely rotates within the housing when the driveshaft is in the rest position.

13 Claims, 5 Drawing Sheets

FOOD PROCESSOR OF THE CITRUS PRESS OR JUICER TYPE

BACKGROUND OF THE INVENTION

1. Field of the Invention

The present invention relates to a food processor of the citrus press or juicer type.

2. Description of the Related Art

This type of food processor generally comprises a base unit which supports drive means which comprise, amongst other things, a rotary spindle. In use, this spindle drives an active food processing implement. When the processor is a citrus press, this implement is a cone against which the fruit, generally cut into two, is pressed. Furthermore, in the case of a juicer, this active implement is generally a grater against which the food product is pushed so that it can be shredded.

There are, firstly, known citrus presses in which the cone rotates continuously. However, this solution is somewhat inconvenient inasmuch as the pressing operation becomes awkward to implement. In addition, it may in some instances prove dangerous to the operator.

To solve this problem, citrus presses have also been produced in which the rotation of the cone is switched on electrically. More specifically, when the fruit is pressed, the force thus used plays a part in closing an electrical contact switch, allowing the motor to be switched on.

When the citrus press is provided with a lever arm for pushing the fruit against the juice-extracting cone, this contact switch is usually positioned on the actual lever itself. There are also other types of citrus press, usually "manual" ones. This contact switch is then positioned according to a translational movement of the juice-extracting cone or of the spindle thereof.

This type of citrus press, that involves an electric contact switch, is, however, accompanied by its own special disadvantages. Specifically, this electrical switch-on entails the use of a motor with a high start-up torque. In addition, this solution is accompanied by frequent startings and stoppings of the motor, particularly during intensive use. As a result, this leads to a reduction in the life of the processor, the number of cycles of the electrical component being inherently limited.

Furthermore, when the motor is switched on electrically, a ramp of acceleration is needed before the nominal extraction speed is reached. Likewise, there is a ramp of deceleration immediately after the motor stops. It will be readily appreciated that this is going to slow down the juice-extracting operation, which is disadvantageous from an economical standpoint, in an industrial setting. In addition, because of the inertia of the various components, there is a period of latency during which the cone is not in the stopped position, and this may cause splashing, together with discomfort or even danger to the operator.

In order to address the disadvantages of this alternative solution, the applicant company has proposed a citrus press of the disengageable type, marketed under the reference No. 10. This processor calls upon a motor that is in continuous operation but which drives the juice-extracting cone only when a pressing force is applied to this cone.

To this end, there is an intermediate member that can be driven by the motor selectively, so that this member has an inactive rest position, and an active drive position. The movement from the rest position to the drive position occurs when a pressing force is applied to the cone, whereas elastic return means tend to return the intermediate member to the rest position when this force is no longer applied.

More specifically, this drive member is in the form of a shaft secured to the cone, which is mounted in an end plate secured to the base unit, with bushings interposed between them. This shaft is extended by a plate able to rest against a rotary platen belonging to the drive means when the pressing force is applied. When this happens, the driveshaft is set in motion, playing a part in causing the cone to rotate. In addition, when this force is released, a return spring pushes the plate back against the end plate secured to the base unit, causing the driveshaft and the cone to stop.

This last solution has numerous advantages, which have led to significant commercial success over a good many years. However, it has been found that this processor No. 10 had a relatively short life, and that some of its constituent parts had to be renewed relatively frequently. In addition, a processor such as this requires a fairly high number of components.

SUMMARY OF THE INVENTION

All that being the case, the invention is aimed at addressing the various abovementioned disadvantages of the prior art.

To this end, the subject of the invention is a food processor, particularly citrus press or juicer, comprising a base unit, drive means provided with a rotary motor spindle, an active processing implement, particularly a juice-extracting cone of the citrus press or a shredding grater of the juicer, this processor further comprising a driveshaft able to be set in motion by the motor spindle so as to drive the active implement, this driveshaft having a rest position and an active position in which it is set in motion, this driveshaft being able to move from its rest position to its active position under the effect of a force applied by the user, whereas return means are provided for returning this driveshaft to its rest position, wherein this driveshaft is a hollow shaft which defines a housing at least partially accommodating the rotary spindle, this rotary spindle being able to rotate freely in this housing when the driveshaft is in the rest position.

According to other features:

the housing is blind at a top of the driveshaft, being open at the opposite end to this top.

the ratio between the height of the housing and the transverse dimension, particularly the diameter of the motor spindle is comprised between 1 and 10, preferably between 4 and 8, and in particular is close to 6, this height being calculated with respect to the opening of the housing and this transverse dimension being calculated in the region of the spindle that is situated in the vicinity of this opening.

the driveshaft is extended by a flange which is provided with first and second friction elements able respectively to collaborate with a first complementary member secured to the base unit and with a second complementary member secured to the drive means.

the peripheral walls of the motor spindle extend directly into the vicinity of the facing walls of the housing without the interposition of any intermediate component between this spindle and the driveshaft.

the rotary motor spindle has a cavity adjacent to the top of the driveshaft, the return means comprising a spring housed in this cavity.

an intermediate element is interposed between the facing walls of the rotary spindle and of the driveshaft, this intermediate element having a degree of freedom in translational movement with respect to the rotary spindle in said rest position, in the main direction of this spindle, while at the same time being forced to rotate as one with the latter, this intermediate element further having a degree of freedom to rotate with respect to the driveshaft in said rest position, in the main direction of this shaft, while at the same time being forced to move as one with the latter in terms of translational movement.

antifriction elements, particularly of the ball bearing, roller bearing or needle bearing type are interposed between the facing walls of the driveshaft and of the intermediate member.

the return means comprise a helical spring interposed between the facing walls of the intermediate member and of the drive means.

BRIEF DESCRIPTION OF THE OF THE DRAWINGS

The invention will be described hereinafter with reference to the attached drawings, given solely by way of nonlimiting examples, and in which.

Figure 3:
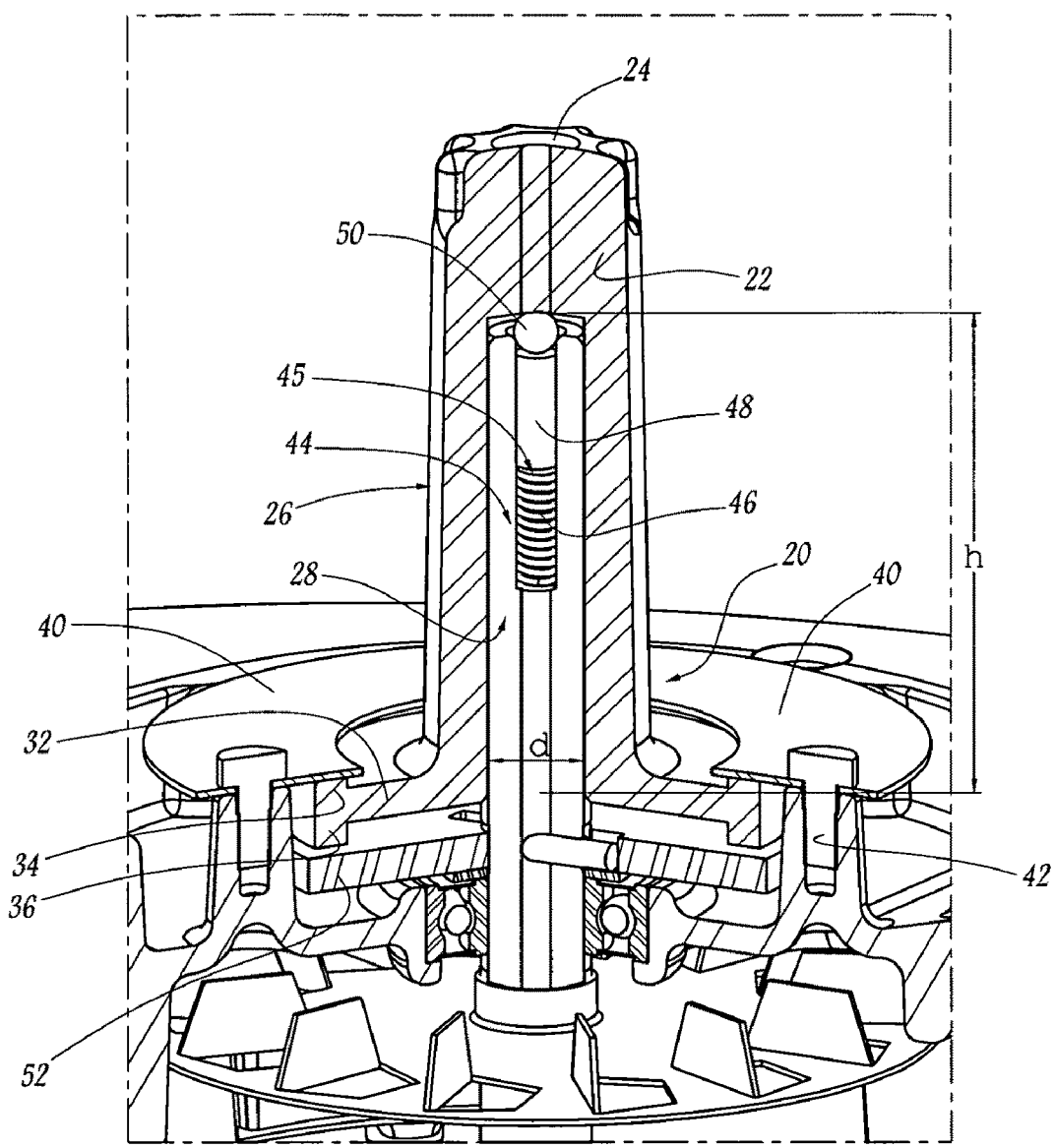
Figure 4:
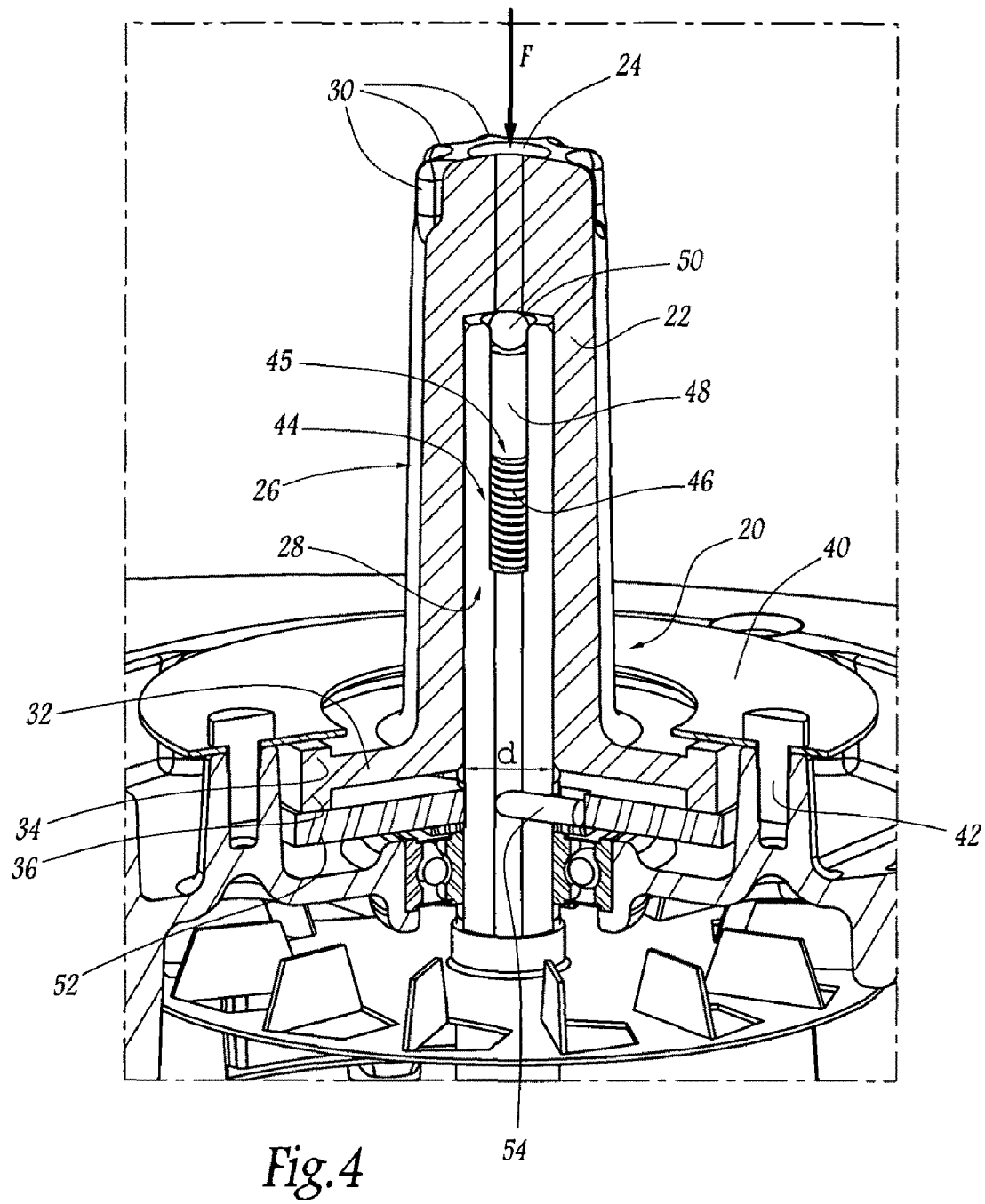
Figure 5:
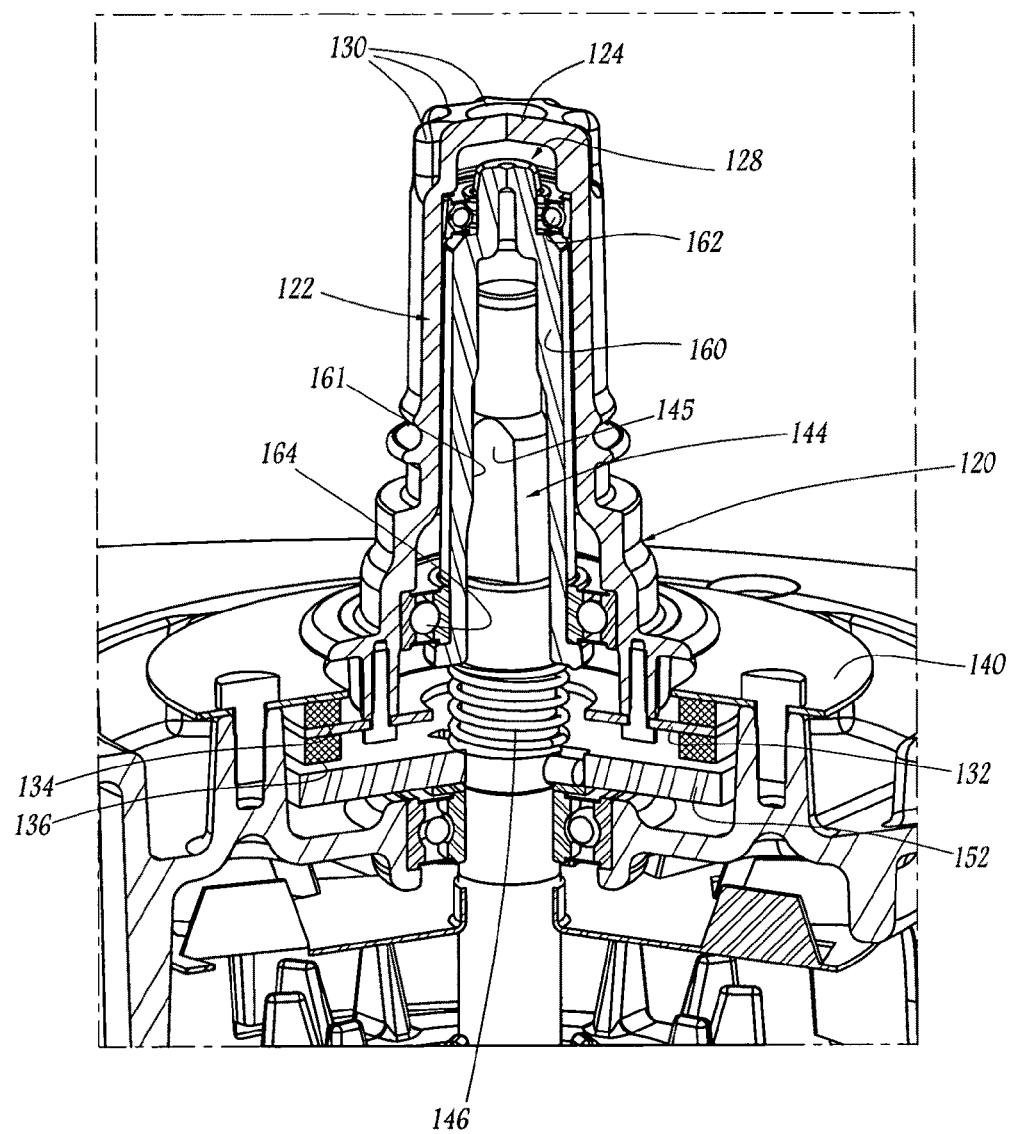
Figure 6:
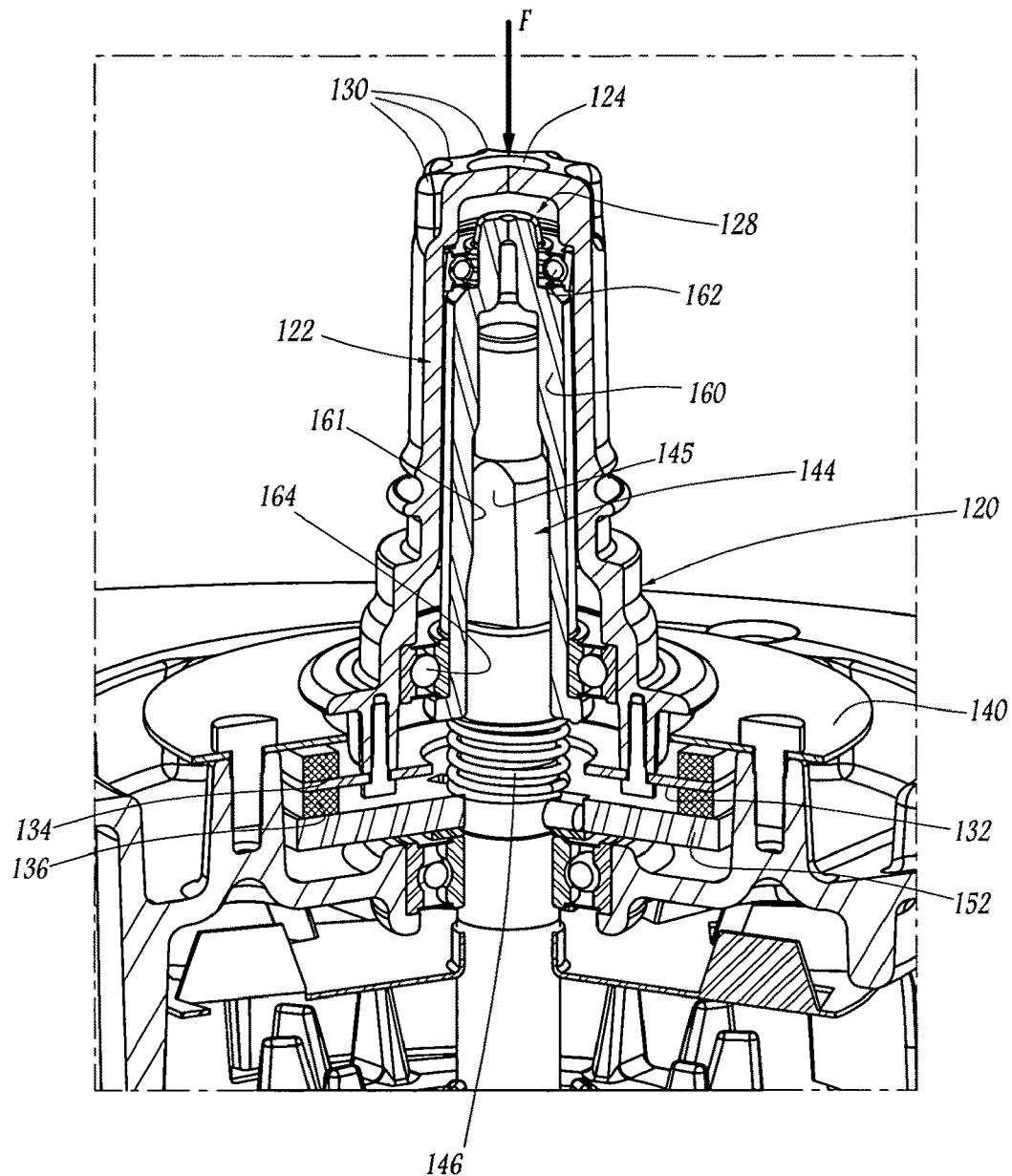

FIGS. 3 and 4 are perspective views, with cutaway, illustrating a processor according to a first embodiment of the invention, at rest and in operation, respectively; and FIGS. 5 and 6 are perspective views, with cutaway, similar to FIGS. 3 and 4, illustrating a processor according to a second embodiment of the invention, at rest and in operation.

DETAILED DESCRIPTION OF THE PREFERRED EMBODIMENTS OF THE INVENTION

Figure 1:
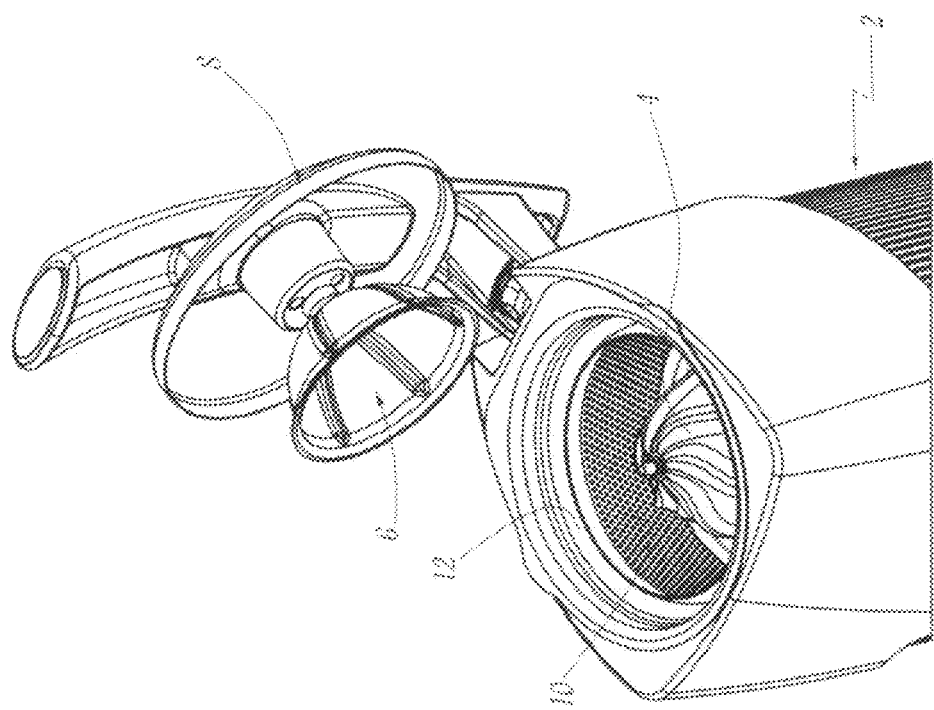
FIG. 1 is a perspective view illustrating a food processor according to the invention.

FIG. 1 illustrates a food processor according to the invention, which in this instance is a citrus press. The latter first of all comprises, in the way known per se, a base unit 2 which supports drive means which have not been depicted in this figure.

There are also a cone 4, that forms a processing implement within the meaning of the invention, which is intended to accept a citrus fruit cut into two. This cone 4 is associated with a cup 6 intended to cap the exterior surface of this citrus fruit, together with a lever arm 8 able to push the cup towards the cone in order to press the citrus fruit.

In a conventional way, the cone 4 is surrounded by a perforated basket 10, which is itself accommodated in a peripheral bowl 12, provided with a dispensing nozzle, not depicted. Thus, in use, the user places a container immediately under this nozzle, to collect the juice from the citrus fruit.

Figure 2:
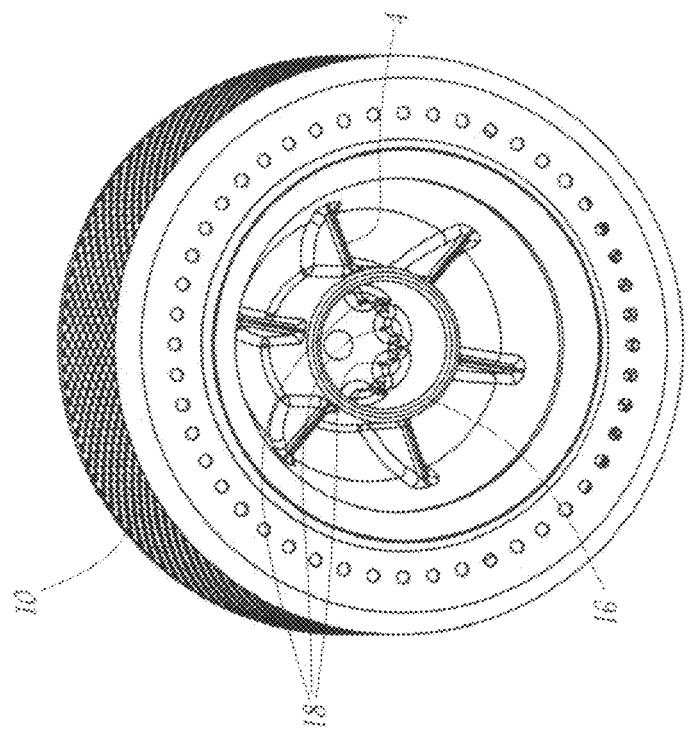
FIG. 2 is a perspective view illustrating, from a different angle, a cone that forms part of this processor.

In addition, as shown by FIG. 2, the base of the cone 4 defines a barrel 16 in which there are notches 18 intended to collaborate with the drive member 20. With reference to FIGS. 3 and 4, the latter first of all comprises a main part 22 forming a shaft. It will be noted that, in accordance with the invention, this shaft 22 is hollow, namely has a closed top 24 from which walls 26 of cylindrical cross section extend.

These walls delimit a housing 28 which is blind in the direction of the closed top 24, but open at the opposite end thereto. This housing extends over a substantial part of the height of the driveshaft 22. If the height of the housing, defined at the bottom by the opening of this housing, is denoted h, and the transverse dimension, in this instance the diameter, of the motor spindle 44 in the region thereof positioned facing this opening is denoted d, then the ratio h/d is advantageously comprised between 1 and 10, preferably between 4 and 8, and in particular is close to 6. The top 24, which is intended to fit into the barrel 16, is provided with notches 30 able to collaborate with the notches 18 of the cone 4, to secure this cone and this shaft 22 to one another.

The shaft 22 is extended, at the opposite end to the top 24, by a flange 32 which has two peripheral rims. One of these rims, 34, is termed the "upper" rim because it extends towards the top 24, while the other rim 36 is termed the "lower" rim because it extends in the opposite direction.

Furthermore, the base unit 2 supports an annular plate 40 secured to this base unit by screws 42. This plate 40, which is positioned at the periphery of the shaft 22, has a lower wall adjacent to the upper rim 34 of the flange 32. As will be seen in greater detail in what follows, this allows the drive member to be slowed.

The drive means comprise first of all a conventional winding, which has not been depicted, which drives the rotation of a spindle 44, coaxial with the shaft 22. It will be noted that, in accordance with the invention, this motor spindle 44 is partially housed in the housing 28 defined by the hollow shaft 22. In addition, this spindle and this shaft are coaxial, namely they have the same main direction.

Between the shaft 22 and the spindle 44 there are both a degree of freedom in translational movement along their main direction, and a degree of freedom to rotate about this same direction. The spindle 44 has a cavity 45 in its upper part near the top 24, to accommodate a return spring 46. The latter supports a wearing cylinder 48, itself surmounted by a bearing ball 50, capable of rubbing against the facing walls of the top 24 of the shaft 22.

Finally, the spindle 44 supports a platen 52, which rotates as one with this motor spindle 44, thanks to the presence of pins 54. This platen 52 and the plate 40, both described hereinabove, are positioned on either side of the rims 34 and 36 of the flange 32.

In the rest position illustrated in FIG. 3, no force is being applied to the cone in the direction of the shaft. As a result, the spring 46 tends to push this shaft back upwards, via the cylinder 48 and the ball 50. When this happens, the upper rim 34 of the flange 32 bears against the plate 40 secured to the base unit.

As a result, the shaft is also secured to the base unit which means that the spindle 44 pivots freely inside the housing 28. It will be recalled that, advantageously, this spindle 44 is set in motion continuously, thus avoiding the disadvantages associated with successive stops and restarts. In this first embodiment, the motor spindle 44 rotates freely near the interior walls of the hollow shaft 22 without any intermediate component interposed between them.

During an operating phase, the user places a citrus fruit against the cone 4, then pushes the lever arm 8 downwards. This therefore generates a force denoted F in FIG. 4, which is directed along the main axis of the shaft 22 and of the spindle 44, namely substantially downwards. This plays a part in pushing the shaft 22 towards the spindle 44 against the action of the spring 46.

On completion of this movement, the lower rim 36 of the flange 32 bears against the platen 52, mounted on the drive means. When this happens, the flange 32 and, therefore, the shaft 22, are not rotationally driven by the motor spindle 44. This therefore leads to the cone 4 being set in motion and to the citrus fruit being pressed.

As soon as the force F is no longer applied, the spring 46 tends to push the shaft 22 back away from the spindle 44. This movement continues until the upper rim 34 of the flange 32 comes into abutment against the fixed plate 40 so that the device is once again in the rest position described with reference to FIG. 3.

FIGS. 5 and 6 illustrate a second embodiment of the invention. In these figures, mechanical elements that are analogous to those of FIGS. 3 and 4 are assigned the same reference numerals, increased by 100.

This second embodiment differs from the one shown in FIGS. 3 and 4 notably in that there is an intermediate piece 160, forming a sliding sleeve, interposed between the driveshaft 122 and the motor spindle 144. This sliding sleeve 160 rotates as one with the motor spindle 144, while at the same time having a degree of freedom in translational movement with respect to this spindle, in the main direction thereof. For this purpose, the spindle 144, which is cylindrical overall, is truncated by flats 145 collaborating with facing flats 161 created on the interior face of the sliding sleeve 160.

In addition, this sliding sleeve 160 moves as one with the shaft 122 in terms of translational movement, while at the same time having a degree of freedom to rotate with respect to this shaft about the main direction thereof. For this, two sets of ball bearings 162 and 164 are interposed between the facing walls of the sliding sleeve and of the shaft, at the upper and lower parts thereof respectively.

In addition, there is a helical spring 146 extending at the exterior periphery of the motor spindle 144. The axial ends of this spring 146 are interposed between the facing walls of the sliding sleeve 160 and of the platen 152 secured to the motor.

Finally, in this second embodiment, the rims 34 and 36 are replaced by upper 134 and lower 136 pads respectively. These pads are advantageously made of a friction material, of the FERRODO type.

FIG. 5 illustrates a rest position of the processor, corresponding to the absence of pressing force, as explained hereinabove with reference to FIG. 3. In this configuration, the motor spindle 144 and the sliding sleeve 160 rotate freely in the housing 128 formed in the hollow shaft 122. In addition, the spring 146 pushes the sliding sleeve 160 towards the top 124 of the shaft 122.

This then causes the upper pads 134 carried by the flange 132 secured to the shaft 122 to come into abutment against the fixed plate 140. As a result, the shaft 122 is secured to the base unit, which means that it is no longer rotated and no longer drives the cone either, so the cone remains stationary.

If a pressing force F is applied (see FIG. 6), this force tends to push the shaft 122 and the sliding sleeve 160 downwards, namely towards the spindle 144. This downwards movement continues until the lower pads 136 come into abutment with the rotary platen 152. When this happens, the hollow shaft 122 is set in motion by the shaft so that it continues to drive the cone and to press the citrus fruit.

Finally, when the aforementioned force is no longer applied, the spring 146 pushes the sliding sleeve 160 back along the spindle 144. This sliding sleeve 160 therefore causes a translational movement of the shaft until such point as the upper pads 134 come into contact with the fixed plate 140. This slows and then stops the driveshaft and the cone.

The invention makes it possible to achieve the aforementioned objectives.

It will be noted first of all that the food processor according to the invention affords satisfactory safety to the operator. Specifically, the active implement, such as the juice-extracting cone or the shredding grater, is not rotationally driven during the phases in which the food is being introduced, and possibly the skins are being removed, in the case of citrus fruit. This stopped rotation is observed even when the rotary motor spindle is set in motion.

This therefore avoids any danger while at the same time limiting the potential for splashes. In addition, this disengagement option allows less demand to be placed on the motor, inasmuch as it makes it possible to dispense with the successive stops and starts involved in some of the prior art solutions.

In addition, the present invention offers special advantages over the use of the applicant company's device No. 10. Specifically, the invention profits from a connection of the "rotary bore" type, by using a hollow shaft penetrated directly by the motor spindle. This solution contrasts with the "rotary shaft" type solution used by device No. 10.

As a result, the present invention is advantageous by comparison with this earlier device No. 10, in terms of sealing. Specifically, the rotary bore solution according to the invention allows the motor spindle to be housed partially inside the driveshaft, as this very appreciably limits its contact with fruit juice, or even with cleaning products. It will therefore be appreciated that the food processor according to the invention has a considerably lengthened life, particularly inasmuch as its various constituent parts are subject to far less harsh operating conditions.

In addition, by virtue of the invention, the pivot connection is made between the driveshaft and the motor spindle, rather than with respect to a fixed component such as the base unit or the base, as in the earlier solution of device No. 10. There is therefore a "natural" coaxiality between this shaft and this spindle, making it possible to avoid lateral offsets.

The invention offers satisfactory sealing as a direct result of the use of a hollow shaft penetrated by the motor spindle. As a result, there is no need for any additional seal because the invention guarantees natural sealing under gravity. In this respect, it will be noted that the invention also allows a reduction in the number of constituent parts involved in the processor.

To rotate the active implement, such as the cone, the driveshaft is associated with a movement requiring guidance, of the pivot connection type. In addition, to implement the clutch device, this driveshaft has also to be associated with a translational movement corresponding to the clutch engagement travel, requiring a sliding connection.

In the first embodiment, corresponding to FIGS. 3 and 4, these two connections are combined. By contrast, in the embodiment of FIGS. 5 and 6, these two connections are separate, thanks to the use of an intermediate member of the sliding sleeve type. This second solution has specific advantages, particularly in that it allows the life of the mechanism to be lengthened by reducing wear.

The invention is not restricted to the examples described and depicted.

It was seen hereinabove that, when the driveshaft is in the rest position, the rotary motor spindle is set in motion directly inside the housing created in this shaft. The friction thus generated can be dealt with by any appropriate means, namely directly as in the embodiment of FIGS. 3 and 4 or alternatively through ball bearings as in the embodiment of FIGS. 5 and 6. It is also possible to anticipate the use of bushings or even of any other suitable mechanical component.

In the examples described and depicted, the connection between the driveshaft and the cone is a removable connection. It is also possible to anticipate creating a driveshaft formed as a single piece with this cone. It is also possible to interpose, between this drive-shaft and this cone, at least one intermediate component.

In the example of FIGS. 5 and 6, the sliding connection between the sliding sleeve and the motor spindle is afforded using flats. However, it is possible to anticipate the use of other means in order to prevent these two elements from rotating relative to one another, such as a pin, a keyway or the like.

In the examples depicted, the driveshaft is extended by a flange which supports the friction elements, namely the rims or the pads. However, these friction elements may be incorporated directly into the driveshaft. The embodiments involving a flange do, however, have specific advantages inasmuch as they make it much easier to fit and bond the friction material and inasmuch as they afford the friction material effective protection against trickling liquid.

Finally, as seen hereinabove, the invention can be applied to food processors other than citrus presses. These may be processors of another type for extracting juice from fruits, using an active implement other than a cone. It is also possible to anticipate using a processor of the juicer type. In the latter instance, the driveshaft supports the assembly formed by the basket of this juicer and its shredding implement, as depicted for example in FIG. 2 of FR-A-2 830 180.

The invention claimed is:

1. A food processor comprising a base unit, drive means provided with a rotary motor spindle driveshaft driven by the motor spindle so as to drive an active implement mounted to an upper end of the driveshaft, the driveshaft having a rest position and an active position in which the driveshaft is set in motion, the driveshaft being movable from the rest position to the active position by a force (F) applied to the driveshaft to urge the drive shaft from a first upper position to a second lower position, return means for returning the driveshaft to the rest position, wherein the driveshaft is a hollow shaft which defines an open housing in which the rotary spindle is at least partially retained, and the rotary spindle being freely rotating in the housing when the driveshaft is in the rest position.

2. The processor according to claim 1, wherein the housing has an upper closed end spaced from a top of the driveshaft and is open from the upper closed end to a lower opening into the housing.

3. The processor according to claim 2, wherein a ratio (h/d) between a height (h) of the open housing and a diameter (d), measured at the opening into the housing, is between 1 and 10.

4. The processor according to claim 3 wherein the ratio of the height to the diameter of the housing is between 4 and 8.

5. The processor according to claim 4 wherein the ratio of the height to the diameter of the housing is 6.

6. The processor according to claim 1, wherein the driveshaft is extended by a flange which is provided with first and second friction elements which are engagable with a first complementary member secured to the base unit and with a second complementary member secured to the drive means.

7. The processor according to claim 1, wherein peripheral walls of the motor spindle extend directly into a vicinity of facing walls of the housing without the interposition of any intermediate component between the spindle and the driveshaft.

8. The processor according to claim 7, wherein the rotary motor spindle has a cavity therein which is within the housing of the driveshaft, the return means including a spring housed in the cavity.

9. The processor according to claim 1, wherein an intermediate element is interposed between facing walls of the rotary spindle and of the driveshaft, the intermediate element having a degree of freedom in translational movement with respect to the rotary spindle in the rest position of the driveshaft, in a main elongated direction of the spindle, while rotatable with the spindle, the intermediate element further having a degree of freedom to rotate with respect to the driveshaft in the rest position of the driveshaft, about an elongated axis of the driveshaft, while at the same time being movable in translation with the driveshaft.

10. The processor according to claim 9, wherein antifriction elements are interposed between facing walls of the driveshaft and of the intermediate member.

11. The processor according to claim 9, wherein the return means includes a helical spring interposed between facing walls of the intermediate member and of the drive means.

12. The processor of claim 9 wherein the antifriction elements are selected from a group of elements consisting of ball bearings, roller bearings and needle bearings.

13. The processor of claim 1 wherein the active processing implement is selected for a group of implements consisting of a juice-extracting cone and a shredding grater.

* * * * *